(12) United States Patent
Wehner

(10) Patent No.: US 7,320,644 B2
(45) Date of Patent: Jan. 22, 2008

(54) UNIVERSAL JOINT WITH BEARING RETENTION DEVICE AND METHOD

(75) Inventor: Robert J. Wehner, Livonia, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 305 days.

(21) Appl. No.: 11/062,934

(22) Filed: Feb. 22, 2005

(65) Prior Publication Data

US 2006/0189395 A1 Aug. 24, 2006

(51) Int. Cl.
*F16D 3/40* (2006.01)
(52) U.S. Cl. ...................... 464/130; 464/128
(58) Field of Classification Search ............... 464/128, 464/130, 136; 411/512
See application file for complete search history.

(56) References Cited

U.S. PATENT DOCUMENTS

| | | | |
|---|---|---|---|
| 2,512,690 A | 6/1950 | Smith et al. | |
| 3,352,127 A * | 11/1967 | Skinner, Sr. | 464/130 X |
| 3,492,710 A | 2/1970 | Pitner | |
| 3,545,232 A | 12/1970 | Neese et al. | |
| 3,881,324 A | 5/1975 | Girquis | |
| 3,958,431 A | 5/1976 | Moring | |
| 4,000,628 A | 1/1977 | Funatani et al. | |
| 4,436,516 A | 3/1984 | Olschewski et al. | |
| 4,540,386 A | 9/1985 | Kampf | |
| 5,417,613 A | 5/1995 | Aiken | |
| 5,797,800 A | 8/1998 | Rhoades et al. | |
| 6,328,654 B1 | 12/2001 | Brisette et al. | |
| 2006/0073901 A1* | 4/2006 | Bommarito | 464/130 |

FOREIGN PATENT DOCUMENTS

| | | | | |
|---|---|---|---|---|
| FR | 1.228.019 | * | 8/1960 | 464/130 |
| GB | 469719 | * | 7/1937 | 464/130 |

* cited by examiner

*Primary Examiner*—Greg Binda
(74) *Attorney, Agent, or Firm*—Harness, Dickey & Pierce, P.L.C.

(57) ABSTRACT

A universal joint includes a spider, first and second yokes drivingly interconnected by the spider, a plurality of bearing cups and a plurality of retaining members. The first yoke includes spaced apart arms with apertures extending through each arm. The apertures are coaxially aligned with one another and include a circumferential groove spaced apart from an edge of the arm. Each bearing cup is positioned within one of the apertures and in receipt of one of the trunnions. A portion of each bearing cup is positioned in communication with a corresponding groove. Each retaining member is operable to complement the size and shape of the corresponding groove, bearing cup and aperture such that each retaining member couples one of the bearing cups to its associated arm.

12 Claims, 3 Drawing Sheets

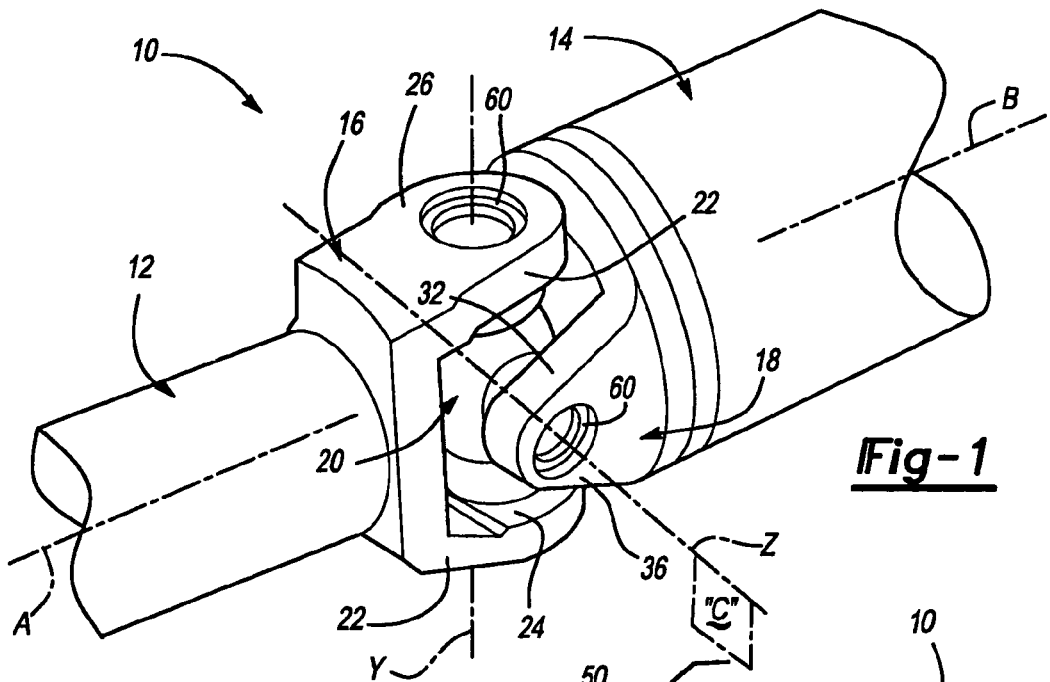
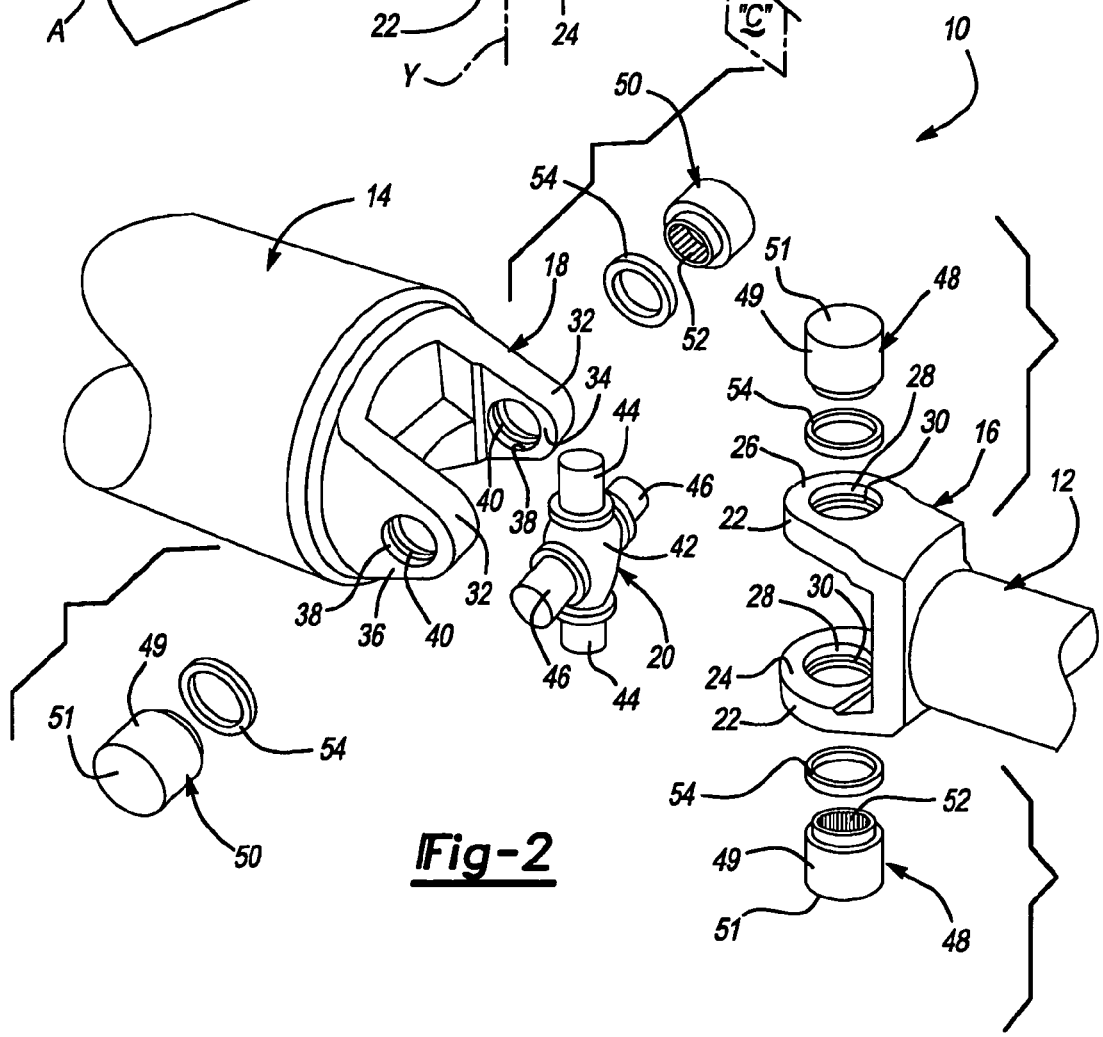

UNIVERSAL JOINT WITH BEARING RETENTION DEVICE AND METHOD

BACKGROUND OF THE INVENTION

The present invention generally relates to a universal joint for use in a driveline of a motor vehicle. More specifically, the present invention pertains to a universal joint equipped with a retention member for securing a bearing cup in a yoke.

As is commonly known, universal joints are used in motor vehicle driveline applications for interconnecting a pair of rotary shafts and permitting changes in angularity therebetween. Many conventional universal joints include a pair of bifurcated yokes which are secured to the rotary shafts. The bifurcated yokes are interconnected by a spider or a cruciform for rotation about independent axes. The spider includes four orthogonal trunnions with each opposing pair of axially aligned trunnions mounted in a pair of aligned bores formed in the bifurcated yokes. Typically, a bearing cup is secured in each bore and a bearing assembly is retained in the bearing cup such that each yoke is supported for pivotal movement relative to one of the pairs of trunnions.

Various retention methods have been developed for securing the bearing cups to the yokes in a manner wherein the rotary axis of each yoke is aligned centrally with respect to the rotary axis of the spider. Traditional bearing cup retention methods include the use of grooves and planar snap rings. In particular, one type of conventional universal joint utilizes a planar snap ring seated in a circumferential groove machined into the bore formed in the yokes for axially retaining the bearing cups. However, due to the dimensional variations within each component, either an interference condition or an excess clearance between the bearing cup and the snap ring is accumulated. If an interference condition exists, one or both of the bifurcated yokes is mechanically deformed to increase the spacing between the previously machined grooves. If an excess clearance condition exists, relative motion may occur between the bearing cup and yoke bores, resulting in noise or vibration during use. Alternatively, an assembler may be provided with a plurality of snap rings having different thicknesses. The assembler uses a trial and error method to fit the largest snap ring possible within the clearance. Unfortunately, the universal joint assembled by these technologies may not be as rotationally balanced as desired.

SUMMARY OF THE INVENTION

Accordingly, the present invention is directed to overcoming the disadvantages commonly associated with the manufacture and balancing of conventional universal joints. Therefore, it is an object of the present invention to reduce the number of components and cost required to construct a balanced universal joint assembly.

The present invention is directed to a universal joint including a spider, first and second yokes drivingly interconnected by the spider, a plurality of bearing cups and a plurality of retaining members. The first yoke includes spaced apart arms with apertures extending through each arm. The apertures are coaxially aligned with one another and include a circumferential groove spaced apart from an edge of the arm. Each bearing cup is positioned within one of the apertures and in receipt of one of the trunnions. A portion of each bearing cup is positioned in communication with a corresponding groove. Each retaining member is operable to complement the size and shape of the corresponding groove, bearing cup and aperture such that each retaining member couples one of the bearing cups to its associated arm.

The method of assembling the universal joint includes providing a yoke with a pair of arms where each of the arms has a trunnion aperture. A trunnion is installed into each trunnion aperture. A plurality of bearing cups are installed such that each bearing cup is received into one of the trunnion apertures and received onto an associated trunnion. Molten polymeric resin is injected into a groove formed in each of the arms. The groove is positioned adjacent to an associate bearing cup. The molten resin is allowed to cool to form a retaining member coupling each bearing cup to its associated arm.

Further areas of applicability of the present invention will become apparent from the detailed description provided herein after. It should be understood however that the detailed description and specific examples, while indicating preferred embodiments of the invention, are intended for purposes of illustration only since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 1 is a perspective view of a universal joint according to the principals of the present invention;

FIG. 2 is an exploded perspective view of the universal joint shown in FIG. 1;

DETAILED DESCRIPTION OF THE PREFERRED EMBODIMENT

Figure 3:
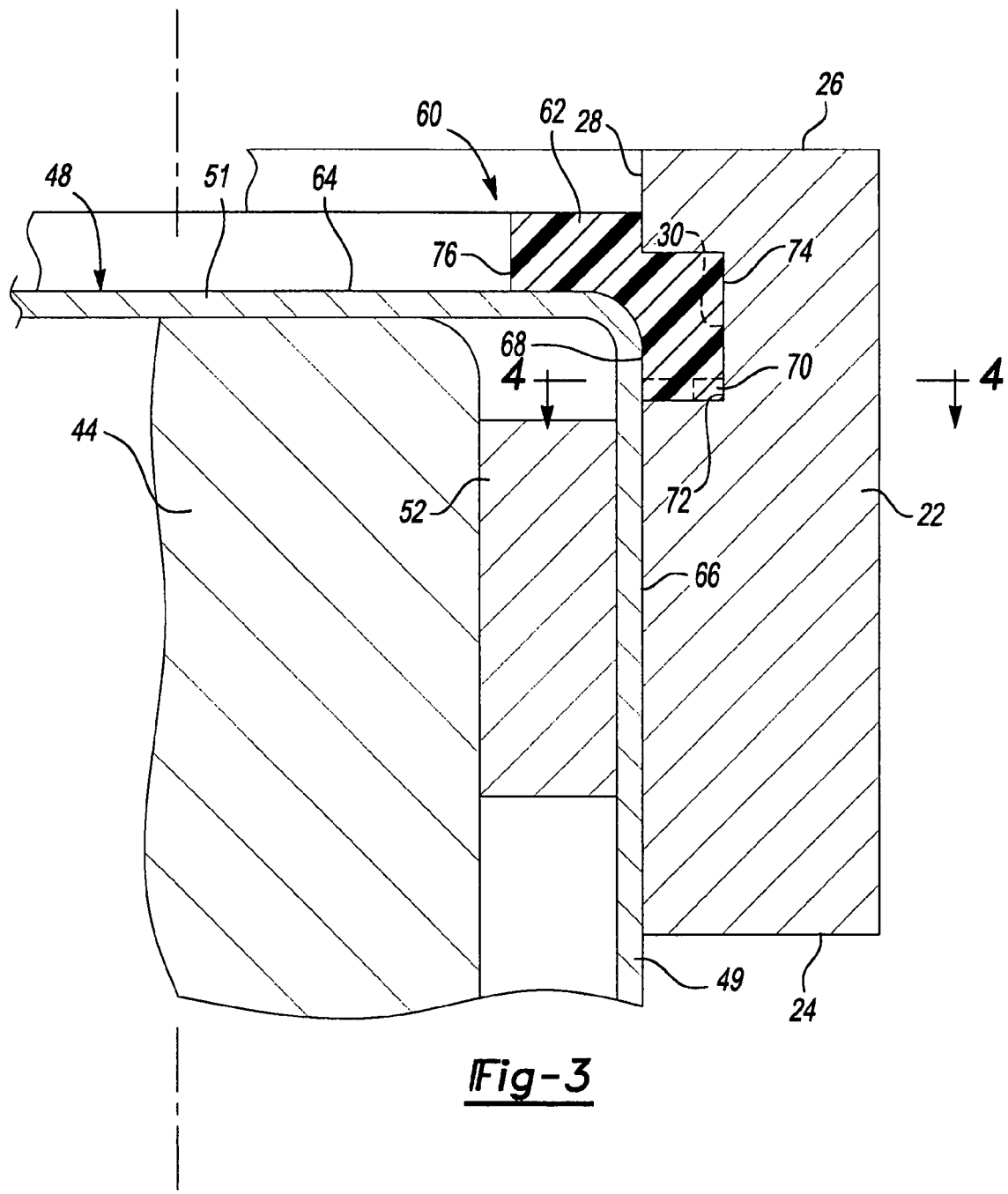
FIG. 3 is a sectional view of the retention member shown in FIG. 1.

In general, the present invention is directed to a universal joint of the type used in motor vehicle driveline applications for interconnecting rotating shafts in a manner permitting changes in angularity therebetween.

Referring to FIGS. 1 and 2, a universal joint 10 is shown connecting a first shaft 12 to a second shaft 14. In general, universal joint 10 includes a first yoke 16 attached to an end of first shaft 12, a second yoke 18 attached to an end of second shaft 14 and a cruciform 20 interconnecting first yoke 16 to second yoke 18. The first yoke 16 is bifurcated and includes a pair of laterally spaced-apart legs 22 which are preferably symmetrical with respect to the rotary axis of first shaft 12, as denoted by construction line A. Legs 22 include an inboard surface 24 and an outboard surface 26 with an aperture 28 extending therebetween. Apertures 28 are aligned on a first trunnion axis, as denoted by construction line Y, which passes through and is orthogonal with respect to rotary axis A of first shaft 12. Each aperture 28 is a throughbore and includes an annular ring groove 30 positioned between the inboard surface 24 and the outboard surface 26.

Second yoke 18 is bifurcated and includes a pair of laterally-spaced legs 32 which are preferably symmetrical with respect to the rotary axis of second shaft 14, as denoted by construction line B. Legs 32 include an inboard surface 34 and an outboard surface 36 with an aperture 38 extending therebetween. Apertures 38 are aligned on a second trunnion axis, as denoted by construction line Z, which passes through and is orthogonal with respect to rotary axis B of second shaft 14. Apertures 38 are throughbores which include an annular groove 40 formed between the inboard surface 34 and the outboard surface 36. It should be noted that the shape and dimensions of apertures 28 and 38 may either be identical or different depending on the particular dimensions of cruciform 20 used therewith. It should also be noted that the annular ring grooves 30 and 40 may be formed by machining, casting or by similar technique.

As best seen in FIG. 2, cruciform 20 includes a central hub 42 from which a pair of first trunnions 44 and a pair of second trunnions 46 extend. First trunnions 44 are orthogonal with respect to second trunnions 46. First trunnions 44 are adapted for insertion into apertures 28 in legs 22 of first yoke 16 so as to be axially aligned on first trunnion axis Y. Similarly, second trunnions 46 are adapted to be inserted into apertures 38 in legs 32 of second yoke 18 so as to be axially aligned on second trunnion axis Z. With first trunnions 44 and second trunnions 46 installed in first and second yokes 16 and 18, respectfully, trunnion axes Y and Z pass through a common plane which orthogonally intersects the rotary axis of cruciform 20, shown in FIG. 1 by construction plane C.

Universal joint 10 also includes a first pair of bearing cups 48 adapted to be mounted in apertures 28 and a second pair of bearing cups 50 adapted to be mounted in apertures 38. First bearing cups 48 are provided for receiving and rotatably supporting first trunnions 44 in apertures 28. Similarly, second bearing cups 50 are provided for receiving and rotatably supporting second trunnions 46 in apertures 38. As seen, bearing cups 48 and 50 each include a tubular sleeve segment 49 enclosed by an end segment 51. A roller bearing assembly 52 is mounted in the sleeve segment for rotatably supporting trunnions 44 and 46 therein. In addition, annular elastomeric seals 54 are mounted on trunnions 44 and 46, respectively, for providing a sealed relationship with respect to the open end of the sleeve segments 49 of bearing cups 48 and 50, respectively.

To assemble the universal joint 10, one of the bearing cups 48 is mounted on one of the first trunnions 44 prior to insertion thereof into its corresponding aperture 28 such that the terminal end surface of the trunnion is placed in abutting engagement with the end segment 51 of its corresponding bearing cup. Alternatively, trunnions 44 and 46 may be installed into corresponding apertures 28 and 38 with bearing cups 48 and 50 thereafter installed into apertures 28 and 38. For purposes of describing the cruciform alignment and retention device used in association with yokes 16 and 18, reference is now directed to FIG. 3. However, while the following disclosure is specifically directed to retention of cruciform 20 relative to first yoke 16, it is to be understood that a similar process is contemplated for use with second yoke 18.

Once rotary axis A of first shaft 12 is co-axially aligned with rotary axis B of second shaft 14, a retention member 60 cooperates with each bearing cup 48 to retain the aforementioned components in relation to each other. FIG. 3 depicts retention member 60 as including a polymeric ring 62 injection molded into engagement with an end face 64 of bearing cap 48. Molten polymeric material substantially fills ring groove 30. Ring groove 30 has a width sized to axially overlap at least a portion of an outer cylindrical wall 66 of sleeve segment 49. In this manner, at least a portion of polymeric ring 62 circumferentially surrounds bearing cup 48. Furthermore, end face 64 of bearing cap 48 lies in a plane intersecting groove 30. Also, a portion of retention member 60 extends axially beyond end face 64 in a direction away from the spider. After the molten resin is injected to fill the annular groove 30 as previously described, the resin is cooled. During cooling, the polymeric material shrinks slightly causing an inner surface 68 of polymeric ring 62 to engage and grip a portion of outer cylindrical wall 66. Therefore, polymeric ring 62 functions as an anti-rotational device to resist relative rotation between bearing cup 48 and leg 22.

Figure 4:
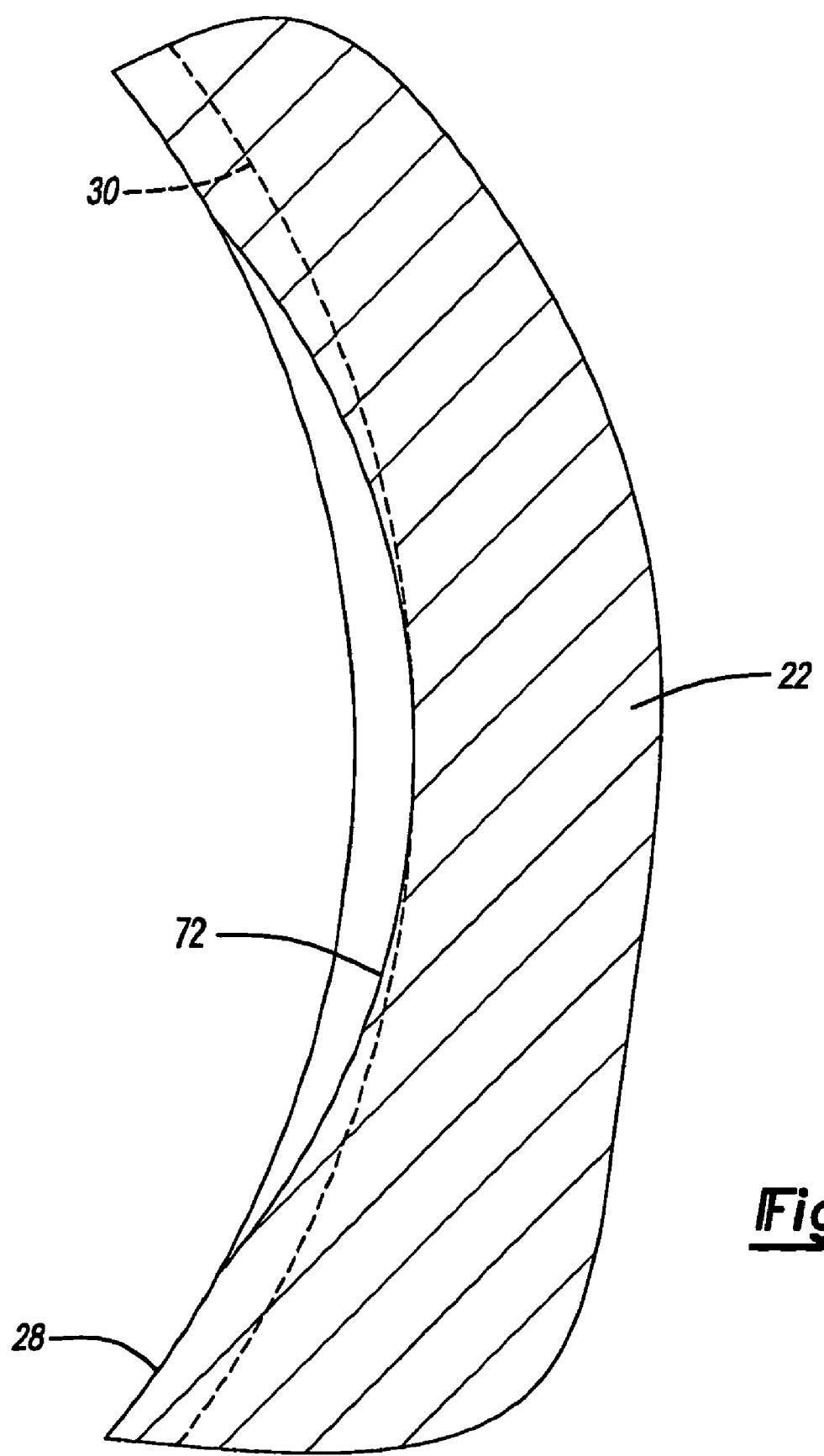
FIG. 4 is a partial sectional view of one of the yokes associated with the universal joint shown in FIGS. 1-3.

As shown in FIGS. 3 and 4, polymeric ring 62 further includes a lug 70 integrally formed with the polymeric ring. Lug 70 is formed when molten resin fills an undercut or recess 72 machined in communication with groove 30. Undercut 72 axially extends from an edge of groove 30. Undercut 72 may be arcuately shaped with a radius less than the radius of ring groove 30. The undercut 72 may radially extend a distance less than or equal to the radius of groove 30. Undercut 72 circumferentially extends an arc length less than the entire circumference of groove 30. Lug 70 and undercut 72 cooperate to further provide an anti-rotational device restricting polymeric ring 62 from rotation relative to leg 22. Polymeric ring 62 includes an outer cylindrical surface 74 and an aperture 76 extending therethrough. Aperture 76 exposes end segment 51 to the atmosphere.

Polymeric ring 62 may be constructed from a variety of materials including nylon, glass-filled nylon, or other injection moldable thermoplastics. These materials have sufficient strength to resist axial movement of bearing cup 48 relative to leg 22 during operation of the universal joint. However, the polymeric ring material has a shear strength which allows bearing cup 48 to be removed from aperture 28 and disconnected from leg 22 to allow the universal joint to be serviced. It is contemplated that the retaining member is operable to be sheared into at least two pieces by application of force to the spider to allow the bearing cups to translate within the apertures and disassemble the universal joint. Because the joint was originally equipped with ring groove 30, the joint may be serviced and reassembled using a standard planar snap ring (not shown).

Therefore, it should be appreciated that the configuration and operation of universal joint 10 provides both manufacturing and functional advantages over the prior art. Specifically, the universal joint 10 of the present invention utilizes a retention member formed by an injection molding process to automate assembly and increase the likelihood of producing a properly aligned and balanced universal joint. Additionally the cost and time required for manufacturing the universal joint are reduced.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A universal joint comprising:
a spider having a plurality of trunnions;
a pair of yokes, each yoke having a pair of arms with an aperture formed therethrough, each yoke being arranged such that an opposite pair of the trunnions are received into the aperture in the arms, each aperture including a ring groove and a discreet recess in communication with the ring groove, the recess axially extending beyond an edge of the ring groove;
a plurality of bearing cups, each bearing cup receiving an associated one of the trunnions and being received into a corresponding aperture and an associated one of the arms, each bearing cup including a substantially cylindrical wall capped by an end wall, wherein the end wall lies in a plane intersecting the ring groove; and
a plurality of retaining members, each retaining member being formed in-situ from a molten injected polymer positioned in the ring groove, each of the retaining members including a lug positioned in the recess coupling an associated one of the bearing cups and its associated arm.

2. The universal joint of claim 1 wherein the retaining member includes an aperture exposing the end wall of one of the bearing cups to the atmosphere.

3. The universal joint of claim 1 wherein a portion of one of the bearing cups axially overlaps a portion of one of the ring grooves.

4. The universal joint of claim 1 wherein the recess circumferentially extends an arc length less than the entire circumference of the ring groove.

5. The universal joint of claim 1 wherein the recess has an arcuate shape with a radius smaller than a radius of the ring groove.

6. The universal joint of claim 1 wherein the end wall includes a planar portion engaged by the retaining member.

7. The universal joint of claim 6 wherein the retaining member extends axially beyond the end wall in a direction away from the spider.

8. A universal joint comprising:
a spider having a plurality of trunnions;
first and second yokes drivingly interconnected by the spider, the first yoke including spaced apart arms with apertures extending through each arm, the apertures being coaxially aligned with one another, each aperture including a circumferential groove spaced from an edge of the arm;
a plurality of bearing cups, each bearing cup being positioned within one of the apertures and in receipt of one of the trunnions, a portion of each bearing cup being positioned in communication with a corresponding groove;
a plurality of retaining members, each retaining member being operable to complement the size and shape of the corresponding groove, bearing cup and aperture in a molten state, each retaining member coupling one of the bearing cups and its associated arm when in a solid state, wherein each retaining member engages a planar portion of an end face and an outer cylindrical surface of one of the bearing cups.

9. The universal joint of claim 8 wherein the end face lies in a plane intersecting one of the grooves.

10. The universal joint of claim 8 wherein the first yoke includes a recess axially extending from the circumferential groove, a portion of the retaining member being positioned within the recess to restrict relative rotation between the first yoke and the retaining member.

11. The universal joint of claim 10 wherein the recess has an arcuate shape with a radius smaller than a radius of the circumferential groove.

12. The universal joint of claim 10 wherein the recess extends a radial extent equal to or less than a radius of the circumferential groove.

* * * * *